United States Patent
Mishra (10) Patent No.: US 9,037,542 B2
(45) Date of Patent: May 19, 2015

(54) REDUCING PROGRAMMING COMPLEXITY IN CLIENT APPLICATIONS WHEN INTERFACING WITH DATABASE SERVERS OPERATING WITH DIFFERENT PROGRAMMING INTERFACES

(75) Inventor: Amulya Mishra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 362 days.

(21) Appl. No.: 11/309,189

(22) Filed: Jul. 11, 2006

(65) Prior Publication Data
US 2007/0260622 A1 Nov. 8, 2007

(30) Foreign Application Priority Data
May 3, 2006 (IN) .............................. 801/CHE/2006

(51) Int. Cl.
G06F 7/00 (2006.01)
G06F 17/30 (2006.01)

(52) U.S. Cl.
CPC .................................. *G06F 17/3056* (2013.01)

(58) Field of Classification Search
None
See application file for complete search history.

(56) References Cited

U.S. PATENT DOCUMENTS

| | | | | |
|---|---|---|---|---|
| 6,785,675 B1 * | 8/2004 | Graves et al. | ........................... | 1/1 |
| 7,113,947 B2 * | 9/2006 | Benson et al. | ................... | 707/10 |
| 7,293,099 B1 * | 11/2007 | Kalajan | ........................... | 709/230 |
| 2005/0197970 A1 * | 9/2005 | Chehade et al. | ................. | 705/80 |
| 2006/0031942 A1 * | 2/2006 | Jones et al. | ...................... | 726/27 |
| 2006/0195547 A1 * | 8/2006 | Sundarrajan et al. | .......... | 709/217 |
| 2006/0206510 A1 * | 9/2006 | Moulhaud et al. | ............ | 707/101 |
| 2007/0174439 A1 * | 7/2007 | Ansari | ........................... | 709/223 |
| 2007/0245409 A1 * | 10/2007 | Harris et al. | ...................... | 726/5 |
| 2008/0046279 A1 * | 2/2008 | Leahy et al. | ...................... | 705/1 |
| 2009/0037391 A1 * | 2/2009 | Agrawal et al. | ................... | 707/3 |

OTHER PUBLICATIONS

Christian S. Jensen Avances in database technology—EDBT 200, vol. 8, p. 298.*

* cited by examiner

*Primary Examiner* — Apu Mofiz
*Assistant Examiner* — Thu Nga Nguyen
(74) *Attorney, Agent, or Firm* — Narendra Reddy Thappeta (57) ABSTRACT

Reducing programming complexity in client applications when interfacing with database servers operating with corresponding programming interfaces. In one embodiment, a client system merely specifies a procedure of interest to be executed on a database server of interest, and a system forms the specific instructions according to the programming interface requirements of the specific database server. Thus, the client applications may be implemented independent of the programming interface requirements of the database servers. The client system may also send data indicating the programming environment (e.g., Java or Visual Basic) in which applications are supported (in the client system). The application sever may form the instructions consistent with the programming environment as well, thereby further reducing the complexity of implementations in the client applications.

14 Claims, 8 Drawing Sheets

401: PPDSServer ppds = new PPDSServer();
        // Send the details to the PPDS
402: ppds.setAllParametersForTheProcedure(pkgName, procName, procType, paramInfo,paramValues);
        //ppds.invoke() will return an array of Object.
403: Object[] obj = ppds.invoke();
        //obj[] will contain the returned result value from PPDS

FIG. 4A

406: PPDSServer ppds = new PPDSServer();
        // Build the XML file for the client
407: XMLFile xmlFile = PPDSServer.buildXMLInClientSide(pkgName, procName, procType,paramInfo,paramValues);
        //ppds.invoke() will return an array of Object
408: Object[] obj = ppds.invoke();
        //obj[] will contain the returned result value from PPDS

FIG. 4B

```
411: <PROCEDURE_CALL LANGUAGE="JAVA">
413:   <DATABASE_MACHINE_NAME>ap633sdb.us.oracle.com</DATABASE_MACHINE_NAME>
414:   <DATABASE_PORT_ID>20066</DATABASE_PORT_ID>
415:   <DATABASE_SID>dev115</DATABASE_SID>
420:   <DATABASE_USER>apps</DATABASE_USER>
425:   <DATABASE_PWD>apps</DATABASE_PWD>
430:   <PACKAGE_NAME>FUN_RULE_PUB</PACKAGE_NAME>
435:   <PROCEDURE_NAME NAME="APPLY_RULE" TYPE="PROCEDURE">
440:     <PARAMETER>
445:       <PARAMETER_NAME>p_application_short_name</PARAMETER_NAME>
450:       <PARAMETER_VALUE>AR</PARAMETER_VALUE>
455:     </PARAMETER>
460:     <PARAMETER>
465:       <PARAMETER_NAME>p_rule_object_name</PARAMETER_NAME>
470:       <PARAMETER_VALUE>FUN_CONTACTUS_SETUP</PARAMETER_VALUE>
475:     </PARAMETER>
480:     <PARAMETER>
485:       <PARAMETER_NAME>p_result</PARAMETER_NAME>
490:       <PARAMETER_VALUE></PARAMETER_VALUE>
495:     </PARAMETER>
497:   </PROCEDURE_NAME>
499: </PROCEDURE_CALL>
```

*FIG. 4C*

```
501: <PROCEDURE_CALL LANGUAGE="JAVA">
503:   <DATABASE_MACHINE_NAME>ap633sdb.us.oracle.com</DATABASE_MACHINE_NAME>
505:   <DATABASE_PORT_ID>20066</DATABASE_PORT_ID>
510:   <DATABASE_SID>dev115</DATABASE_SID>
515:   <DATABASE_USER>apps</DATABASE_USER>
520:   <DATABASE_PWD>apps</DATABASE_PWD>
523:   <PACKAGE_NAME>FUN_RULE_PUB</PACKAGE_NAME>
525:   <PROCEDURE_NAME="APPLY_RULE" TYPE="PROCEDURE">
530:     <PARAMETER>
533:       <PARAMETER_NAME>application_short_name</PARAMETER_NAME>
535:       <PARAMETER_MODE>in</PARAMETER_MODE>
540:       <PARAMETER_DATA_TYPE>varchar2<PARAMETER_DATA_TYPE>
543:       <PARAMETER_VALUE>AR</PARAMETER_VALUE>
545:     </PARAMETER>
550:     <PARAMETER>
553:       <PARAMETER_NAME>rule_object_name</PARAMETER_NAME>
555:       <PARAMETER_MODE>in</PARAMETER_MODE>
560:       <PARAMETER_DATA_TYPE>varchar2<PARAMETER_DATA_TYPE>
563:       <PARAMETER_VALUE>FUN_CONTACTUS_SETUP</PARAMETER_VALUE>
565:     </PARAMETER>
570:     <PARAMETER>
575:       <PARAMETER_NAME>result</PARAMETER_NAME>
580:       <PARAMETER_MODE>out</PARAMETER_MODE>
585:       <PARAMETER_DATA_TYPE>varchar2<PARAMETER_DATA_TYPE>
590:       <PARAMETER_VALUE></PARAMETER_VALUE>
595:     </PARAMETER>
597:   </PROCEDURE_NAME>
599: </PROCEDURE_CALL>
```

FIG. 5

```
605: try {
615:     StringBuffer stmt = new StringBuffer();
620:     stmt.append("BEGIN FUN_RULE_PUB.APPLY_RULE  ('");
630:     stmt.append("p_application_short_name  => :1,'");
635:     stmt.append("p_rule_object_name  => :2'");
640:     stmt.append("p_result => :3'");
645:     stmt.append("'); END;'");

650:     OracleCallableStatement cStmt = (OracleCallableStatement)conn.prepareCall(stmt.toString());
655:     String sResult = cStmt.registerOutParameter(3,Types.VARCHAR,0,1000);
660:     cStmt.setString(1,"AR");
665:     cStmt.setString(2,"FUN_CONTACTUS_SETUP");

668:     cStmt.Execute();
670:     return sResult;

680:}catch(Exception e) {
690:     throw e;
699: }
```

REDUCING PROGRAMMING COMPLEXITY IN CLIENT APPLICATIONS WHEN INTERFACING WITH DATABASE SERVERS OPERATING WITH DIFFERENT PROGRAMMING INTERFACES

RELATED APPLICATIONS

The present application is related to and claims priority from the co-pending India Patent Application entitled, "Reducing Programming Complexity In Client Applications When Interfacing With Database Servers Operating With Different Programming Interfaces", Serial Number: 801/CHE/2006, Filed: 3 May 2006, naming the same inventors as in the subject patent application.

BACKGROUND OF THE INVENTION

1. Field of the Invention

The present invention relates to client-server applications and more specifically to a method and apparatus for reducing programming complexity in client applications when interfacing with database servers operating with different programming interfaces.

2. Related Art

Client application generally refers to portions of an application executed on user systems. For example, a client application may contain software code, which when executed provides for a graphical display to enable users to provide values for various input data and to process the provided values. Such processing often entails computations in addition to accessing (read, store, delete and modify) data from the database servers.

A database server is often implemented with a programming interface. A programming interface generally indicates a specific format in which instructions are to be provided (to a database management system contained in the database server) to execute a corresponding procedure/function (which would cause data to be accessed) provided within the database server. For example, a database management system may support execution of multiple functions/procedures, and a client system may be required to send instructions consistent with the format specified by the programming interface of the corresponding function/procedure.

Different database servers (or database management systems) are implemented with different programming interfaces, for example, as the implementations are often vendor (e.g., the interface requirements are different for database servers provided by IBM versus those provided by Oracle International Inc) and/or standard (e.g., ODBC vs. JDBC) dependent.

In several prior environments (e.g., in a "client server environment" in which client applications are implemented with at least substantial intelligence), when a client application needs to interface with different database servers, the client application needs to provide different instructions consistent with each of the programming interfaces.

Such is the case even when client instructions interface with the database servers via an embodiment of application servers, which at least substantially forward (or pass through) the database access requests. Accordingly, a client application may need to be implemented consistent with the interface requirements of the specific database server sought to be accessed in such a prior approach.

From the above, it may be appreciated that the complexity of client applications is enhanced when a client system needs to access different database servers implementing different programming interfaces.

The complexity of developing such client applications is further increased since the specific environment (e.g., Java, Visual Basic) in which the client application operates often forces different programming interfaces to the database servers. Thus, a database server may require different instructions depending on the environment in which the client application operates.

Therefore, what is needed is a method and apparatus for reducing programming complexity in client applications when interfacing with database servers operating with different programming interfaces.

SUMMARY

As aspect of the present invention reduces the programming complexity in client applications when interfacing with database servers operating with corresponding programming interfaces. In one embodiment, a client system specifies a procedure of interest to be executed on a database server of interest, and a program processor driver system forms the specific instructions according to the programming interface requirements of the specific database server.

Thus, the client applications may be implemented independent of the programming interface requirements of the database servers.

The client system may also send data indicating the programming environment (e.g., Java or Visual Basic) in which applications are supported (in the client system). The application sever may form the instructions consistent with the programming environment as well, thereby further reducing the complexity of implementations in the client applications.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
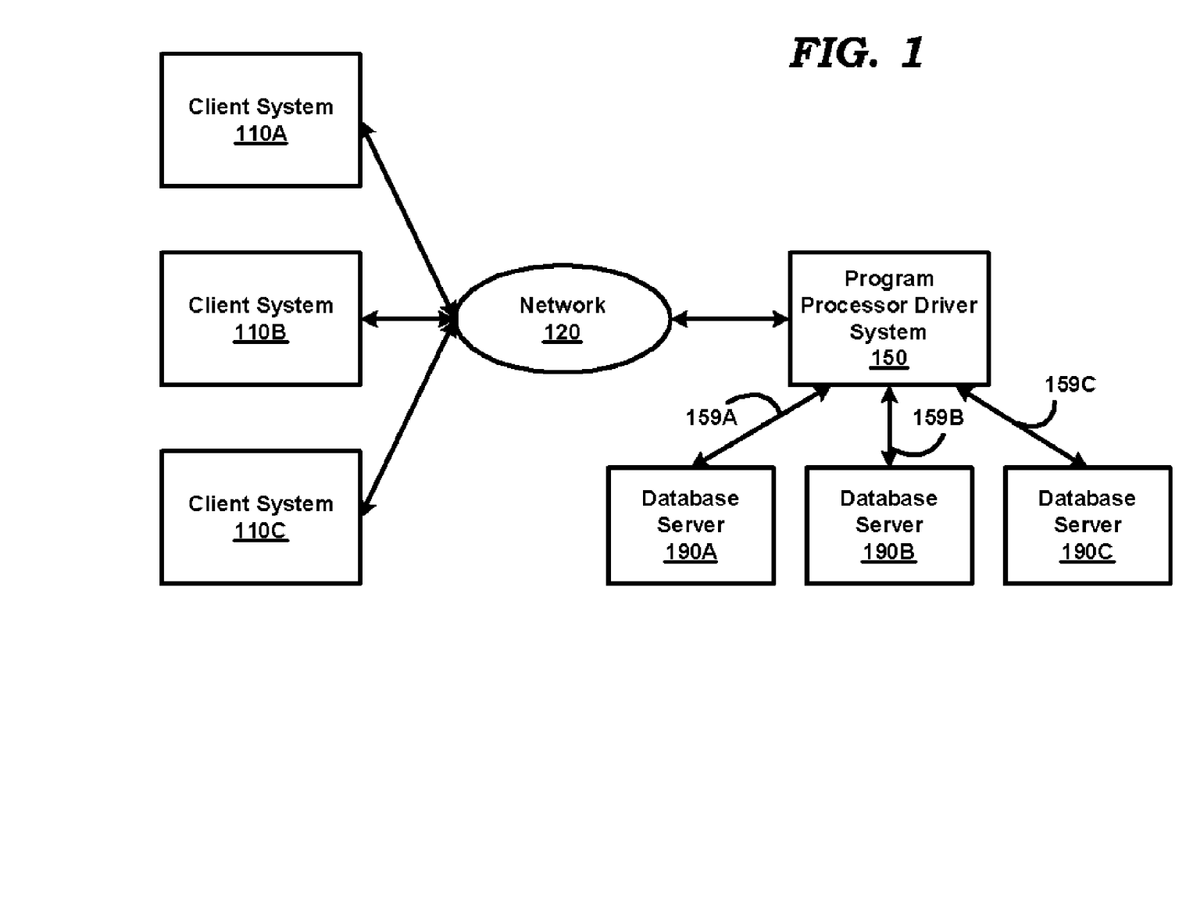
FIG. 1 is a block diagram illustrating the details of an example environment in which various aspects of the present invention can be implemented.

FIG. 1 is a block diagram illustrating an example environment in which various aspects of the present invention can be implemented. The block diagram is shown containing client systems 110A-110C, network 120, Program Processor Driver (PPD) System 150, and database servers 190A-190C. Merely for illustration, only representative number/type of systems are shown in the Figure. Many environments often contain many more systems. Each system/device of FIG. 1 is described below in further detail.

Network 120 provides connectivity between various client systems 110A-110C, application server 160 and PPD System 150, which forms the basis for sending requests from client systems 110A-110C to PPD System 150, and to send the corresponding responses back from PPD System 150 to client systems 110A-110N. Network 120 may be implemented using protocols such as Internet Protocol (IP), asynchronous transfer mode (ATM)/Frame Relay, etc., well known in the relevant arts.

PPD System 150 receives requests from client systems 110A-110C and generates corresponding responses. Some of the requests relate to accessing the data in database servers 190A-190C. Various aspects of the present invention enable the implementations on client systems to be simplified as described in below sections in further detail. In an embodiment, in a J2EE environment, the PPD System is implemented as an Enterprise Java Bean well known in relevant arts.

Database servers 190A-190C facilitate storage and retrieval of data using structured queries such as SQL in the case of relational database technologies. Database servers 190A-190C contain various procedures/functions defined using a language (such as PL/SQL in Oracle Servers), which can be caused to execute by instructions received on respective paths 159A-159C consistent with a corresponding programming interface. For illustration, it will be assumed in the below description that each of the databases 190A-190C requires a different programming interface. Database servers 190A-190C may be implemented using any of various commercially available databases.

Client systems 110A-110C execute various client applications to generate requests sent to PPD System 150, and process the corresponding responses. Client systems 110A-110C may also provide necessary programming environment in which corresponding client application are executed. For illustration, it is assumed in the below description that client systems 110A-110C respectively operate in Java™, Visual Basic™, .Net™ environments.

The requests sent by client systems 110A-110C according to various aspects of the present invention cause instructions consistent with the corresponding programming interface to be sent on the desired one of paths 159A-159C, as described in below sections in further detail.

3. Flow Chart

Figure 2:
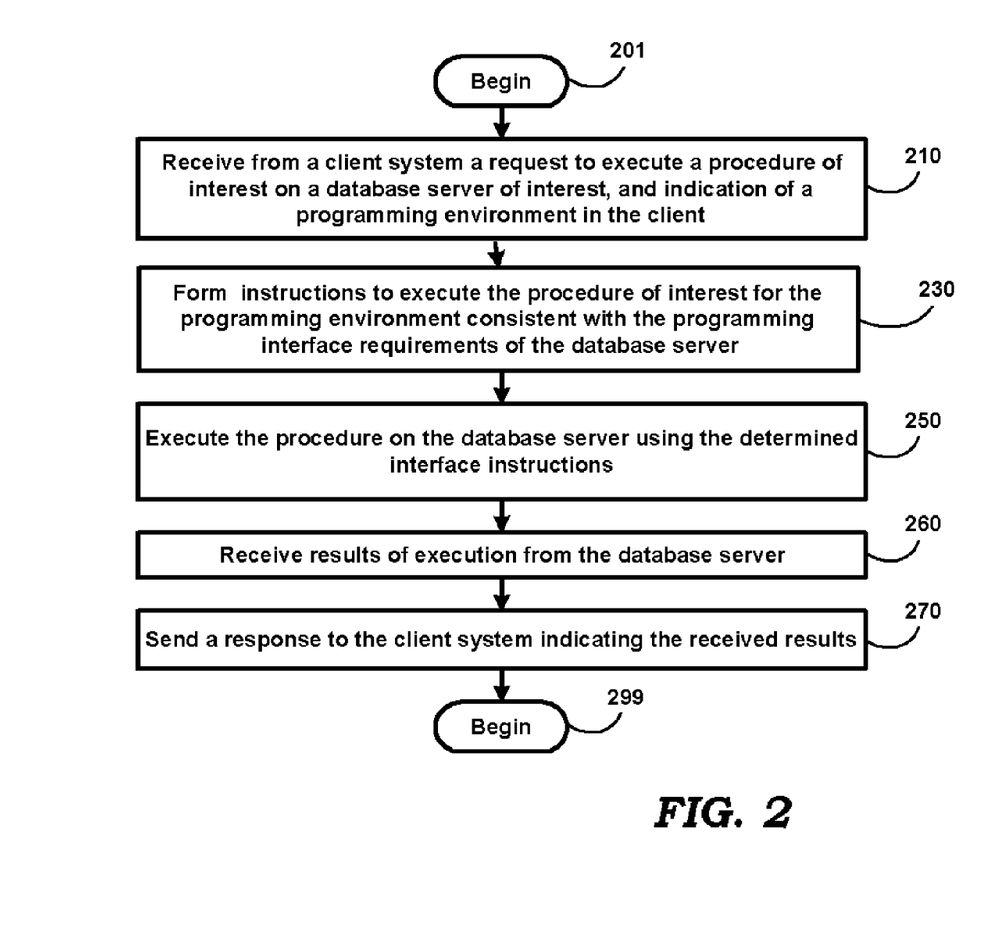
FIG. 2 is a flowchart illustrating the manner in which a server generates instructions to access database servers consistent with corresponding programming interfaces according to various aspects of the present invention.

FIG. 2 is a flowchart illustrating the manner in which a server/system generates instructions to access database servers consistent with corresponding programming interfaces according to various aspects of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. The flow chart begins in step 201, in which control immediately passes to step 210.

In step 210, PPD System 150 receives (e.g., from client system (110A)) a request to execute a procedure of interest on a database server 190A-190C of interest, and data indicating a programming environment in the client. In an embodiment, identifier (e.g., name) of function/procedure of interest, identifier (e.g., host name or IP address) of database server 190A-190C on which the function/procedure is to be executed, values of input parameters for the execution of the function/procedure and identifier of the programming environment of client system 110A are received with the request. However some of the data may be received from other sources as well, as suited for the specific programming environment. For example, data representing the programming environment of each client system may be provided a priori by an administrator, stored in a local secondary storage (of PPD System 150), and received there from.

In step 230, PPD System 150 determines instructions to execute the specified procedure of interest on the database server of interest for the programming environment consistent with the programming interface requirements of the database server. The format/structure of instructions can be determined either by accessing data contained in the database server of interest or by accessing details, which are stored a priori in PPD System 150. In general, the programming interface of the database server (sought to be accessed) determines the format/structure of the instructions.

In step 250, PPD System 150 executes the procedure on database server 190A-190C using the determined instructions. In general, the determined instructions are sent on one of paths 159A-159C to cause the execution. The execution of the instructions on database servers may cause operations such as opening/closing of connections to database, as well as access of the data.

In step 260, PPD System 150 receives results of execution from the database server. In step 270, PPD System 150 sends a response to the client system indicating the received results via network 120. The results are provided consistent with the programming environment of the client systems from which the request was received in step 210. The flowchart ends in step 299.

It may be further appreciated that the programming complexity of client applications in client systems 110A-110C is reduced since PPD System 150 determines the instructions required for execution of the procedure/function on database servers 190A-190C. Accordingly, the description is continued with the illustration of operation of a client system (110A-110C) according to an aspect of the present invention.

4. Client System

Figure 3:
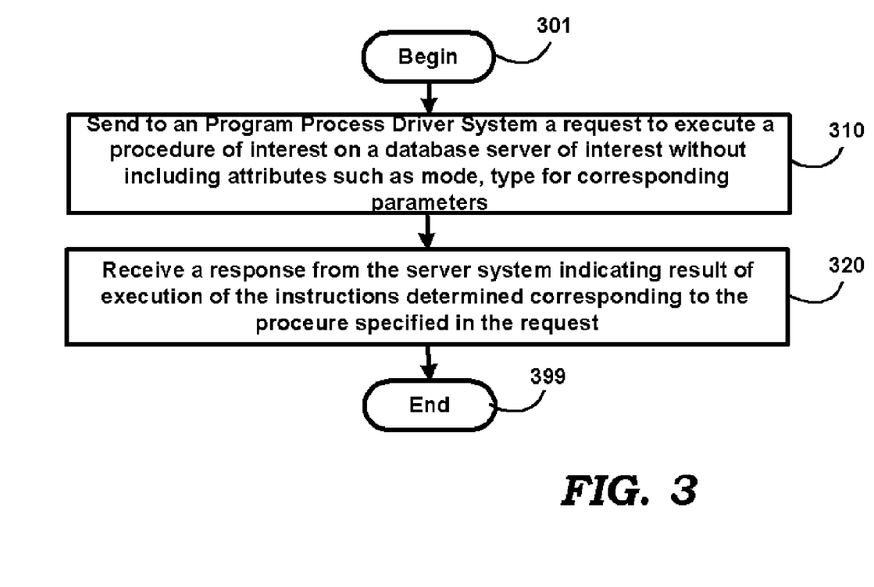
FIG. 3 is a flowchart illustrating the manner in which client systems may execute a procedure on a database server of interest according to various aspects of the present invention.

FIG. 3 is a flowchart illustrating the manner in which client systems may execute a procedure on a database server of interest according to various aspects of the present invention. The flowchart is described with respect to FIG. 1 merely for illustration. However, various features can be implemented in other environments also without departing from various aspects of the present invention, as will be apparent to one skilled in the relevant arts by reading the disclosure provided herein. The flow chart begins in step 301, in which control immediately passes to step 310.

In step 310, client system 110A sends to PPD System 150 a request to execute a procedure of interest on a database server of interest. The request is sent without one or more of various details such as specific instruction format and attributes (e.g., mode, type) of corresponding parameters required by the procedure. As described above with respect to FIG. 2, PPD System 150 may determine such details and accordingly the programming complexity in client system 110A is reduced.

In step 320, client system 110A receives a response from the server system indicating the result of execution of the instructions determined corresponding to the procedure specified in the request. The format of the result can be consistent with the programming environment of client system 110A, as also described above with respect to FIG. 2. The flowchart ends in step 299.

The description is continued with an illustration of a portion of a client application from which a request is made to initiate execution of a procedure in an embodiment of the present invention.

5. Example Request

Figure 4A:
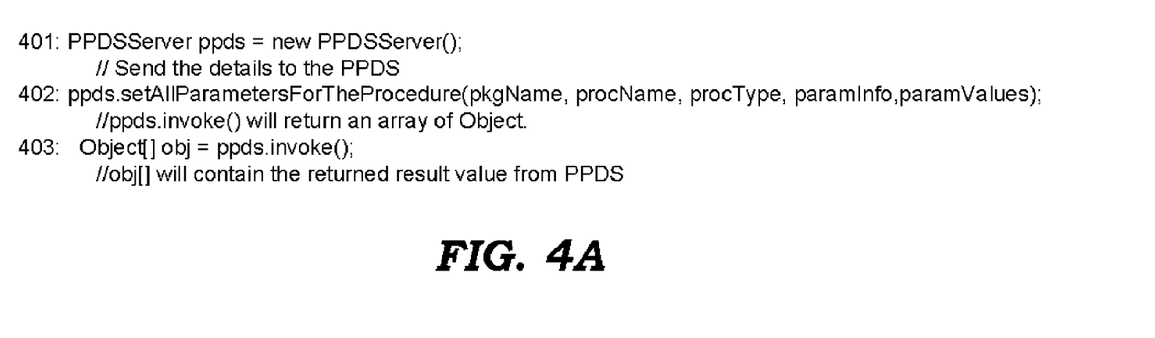
FIG. 4A represents a file containing a portion of program lines in an application on a client system for sending a request to a server system in an embodiment of the present invention.
Figure 4B:
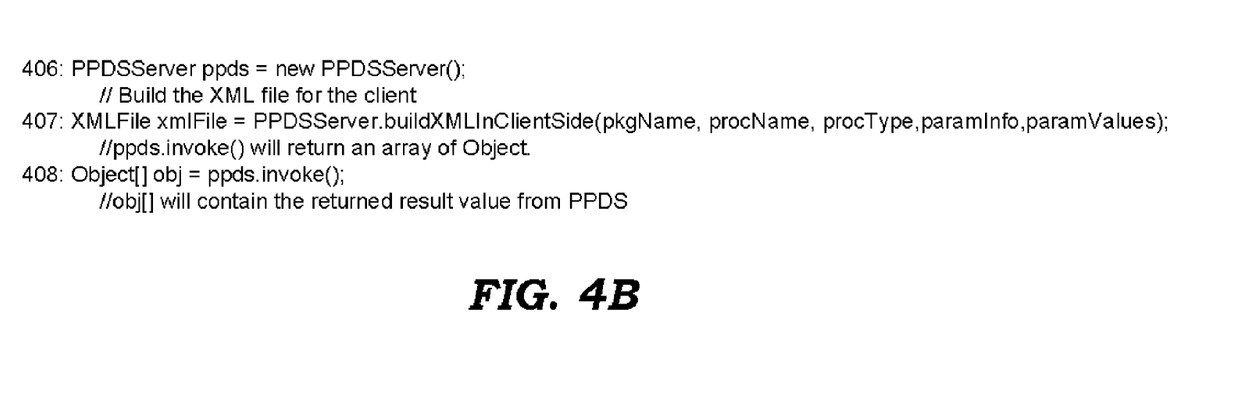
FIG. 4B represents a file containing some of the parameters used while forming a request in an embodiment of the present invention.
Figure 4C:
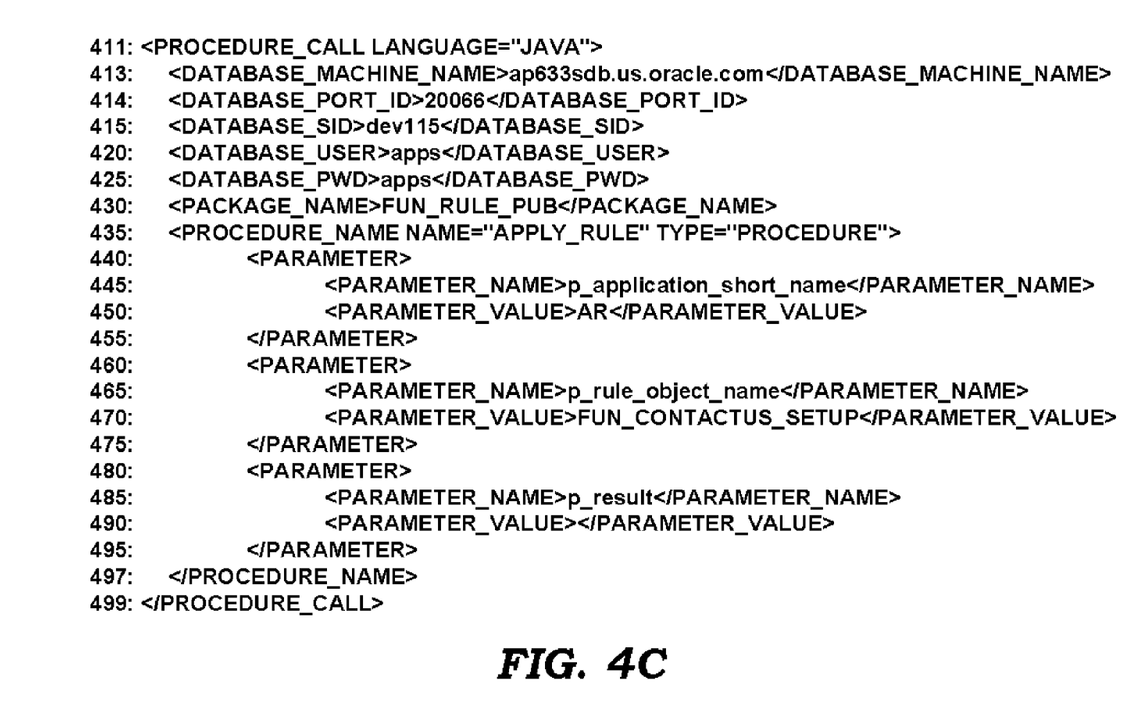
FIG. 4C depicts the content of an XML file containing various parameters corresponding to sending of a request to a server system in one embodiment.

FIGS. 4A, 4B and 4C together illustrate the manner in which client systems 110A-110C may send requests to PPD System 150 to initiate execution of desired procedures on database servers 190A-190C. Each of the figures is described in detail below.

FIG. 4A represents a file containing a portion of program lines in an application on a client system corresponding to sending of a request to a server system of in one embodiment.

Line 401 depicts a command which when executed, instantiates an instance (accessible by variable "ppds") of an object of type "PPDSServer", the methods of which can then be invoked to cause PPD System 150 to send the desired instructions to the desired one of database servers 190A-190C.

In particular, the method in line 402 ("setAllParametersForTheProcedure") assigns values to various parameters, which are required by PPD System 150 to process the received request. In an embodiment, values of parameters "pkgName", "procName", "procType", "paramInfo", "paramValues" are sent along with the request, respectively indicating identifiers for the package containing the procedure, procedure of interest, procedure type (for example, "PROCEDURE" or "FUNCTION"), values and the names of the corresponding parameters for executing the procedure.

The method on execution may use the values of the parameters in generating (in PPD System 150) Extended Markup Language (XML) content as shown in FIG. 4C described below. Alternatively, PPD System 150 may store the values of the parameters indicated in line 402 in memory.

Line 403 causes execution of a method "invoke" on the "ppds" object. Executing the method enables client system 110 to initiate the processing of the request in PPD System 150, which then determines instructions to execute the procedure of interest specified. Additional details on how PPD System 150 may determine instructions for executing the procedure consistent with the corresponding programming interface is described below with reference to FIGS. 5 and 6 below.

It may be appreciated that different high-level protocols may be used for sending/receiving the data between the client systems and the PPD system. Commonly used protocols such as RPC (Remote Procedure Call) and RMI (Remote Method Invocation) may be used to send data such as the identifier of a function/procedure, the identifier of a database, the input parameters for the execution of the function/procedure and details of the programming environment by client systems 110A-110C to PPD System 150 through network 120. In an embodiment according to FIGS. 4A and 4B (described below), RMI protocol is used by the Java programs to send/receive data between the client systems and the PPD system.

Thus, after a result of execution of the procedure (identified by the parameter "procName") in the specified one of database servers 190A-190C is obtained, PPD system 150 creates an object (of type Object[ ]) according to the programming language (here "Java" as shown in line 411, described below) specified in the request. The newly created object (which is according to the programming environment of the requesting client system) is then sent using RMI protocol to client system 110.

As the result of execution is already received in the form of object (in the programming environment of the client system), additional programming logic is not required in the client system for the creation/population of objects, thereby further reducing the programming complexity in client applications. The complexity is reduced for other programming languages (e.g., Visual Basic noted above) and other protocols (e.g., RPC) as well.

FIG. 4B represents a file containing a portion of program lines in an application on a client system corresponding to sending of a request to a server system in another embodiment.

Lines 406 and 409 correspond to lines 401 and 403 of FIG. 4A and perform the same operations. Line 407 depicts a method "buildXMLInClientSide" of "PPDSServer" object by which client system 110A assigns various parameters of the request to be sent to PPD System 150 and generates XML content (at client system 110A) depicted in FIG. 4C described below. Line 408 depicts a method "setXMLFile", wherein client system 110A sends the request (XML content of FIG. 4C) to PPD System 150.

It may be appreciated that the request (for initiating execution of a function/procedure in a database server) may be generated in the form of XML either at client systems 110A-110C or at PPD System 150 and on receiving an indication ("invoke" method) to process the request, PPD System 150 determines the instructions for executing the procedure using the content of the XML.

FIG. 4C depicts the content of an XML file containing various parameters corresponding to sending of a request to a server system in one embodiment. Mark up language elements ("tags") are used to indicate various contents of interest in the XML file, as is well known in the relevant arts. A common set of tags may be pre-specified (as required by PPD System 150) to indicate various contents of interest in the XML file.

Line 411 depicts a tag "PROCEDURE_CALL_LANGUAGE" and its content "JAVA" representing the specific programming environment on client system 110A-110C. Lines 413 to 425 depict the database of interest and the parameters required (for example, user name and password) to identify/access the database. In particular, line 413 depicts the tag "DATABASE_MACHINE_NAME" and its content identifies the database server (190A-190C) of interest. Other tags specify the database port ("DATABASE_PORT_ID"), the user name ("DATABASE_USER") and the password ("DATABASE_PWD") to be used for accessing the database.

It may be observed that the contents of Lines 411 to 425 are not explicitly shown in the portions of programming lines shown in FIGS. 4A and 4B. In one embodiment, the various database access parameters (corresponding to contents of Lines 411 to 425) are specified as portions of a single string passed as parameter "pkgName" in line 402 of FIG. 4A or line 407 of FIG. 4B.

Lines 430 to 497 depict the content generated from the parameters received in line 402 of FIG. 4A or in line 407 of FIG. 4B. Line 430 is generated from parameter (or a portion of) "pkgName" and depicts a tag "PACKAGE_NAME" whose content "FUN_RULE_PUB" specifies the package name of interest.

Line 435 (and Line 497) is generated from parameters "procName" and "procType" and depicts a tag "PROCEDURE_NAME" specifying the name "APPLY_RULE" of the procedure of interest (in attribute "NAME") and the type "PROCEDURE" of the procedure (in attribute "TYPE").

Lines 440 to 495 are generated using the values passed in the parameters "paramInfo" and "paramValue". For example, lines 440 to 455 represent an input parameter (of the procedure of interest) with name "p_application_short_name" (as shown in line 445) and value "AR" (as shown in line 450). Similarly, parameters with name "p_rule_object_name" (as shown in lines 460 to 475) and "p_result" (as shown in lines 480 to 495) are generated. It may be observed that the value of parameter "p_result" shown in line 490 is empty since the parameter is an output parameter.

It may be observed from the contents of the XML file of above that some attributes such as mode, type for the parameters are not provided (as indicated with reference to line 310) in the request sent from the client system 110A.

Due to the approach described above, it may be appreciated that the implementation on each client system is at least substantially independent of the programming interface of the specific database server. In addition, the complexity resulting from the differences of the programming environments of client systems can also be addressed by PPD System 150 (due to the information in line 411), as described below in further detail.

6. Determining Interface Instructions

Figure 5:
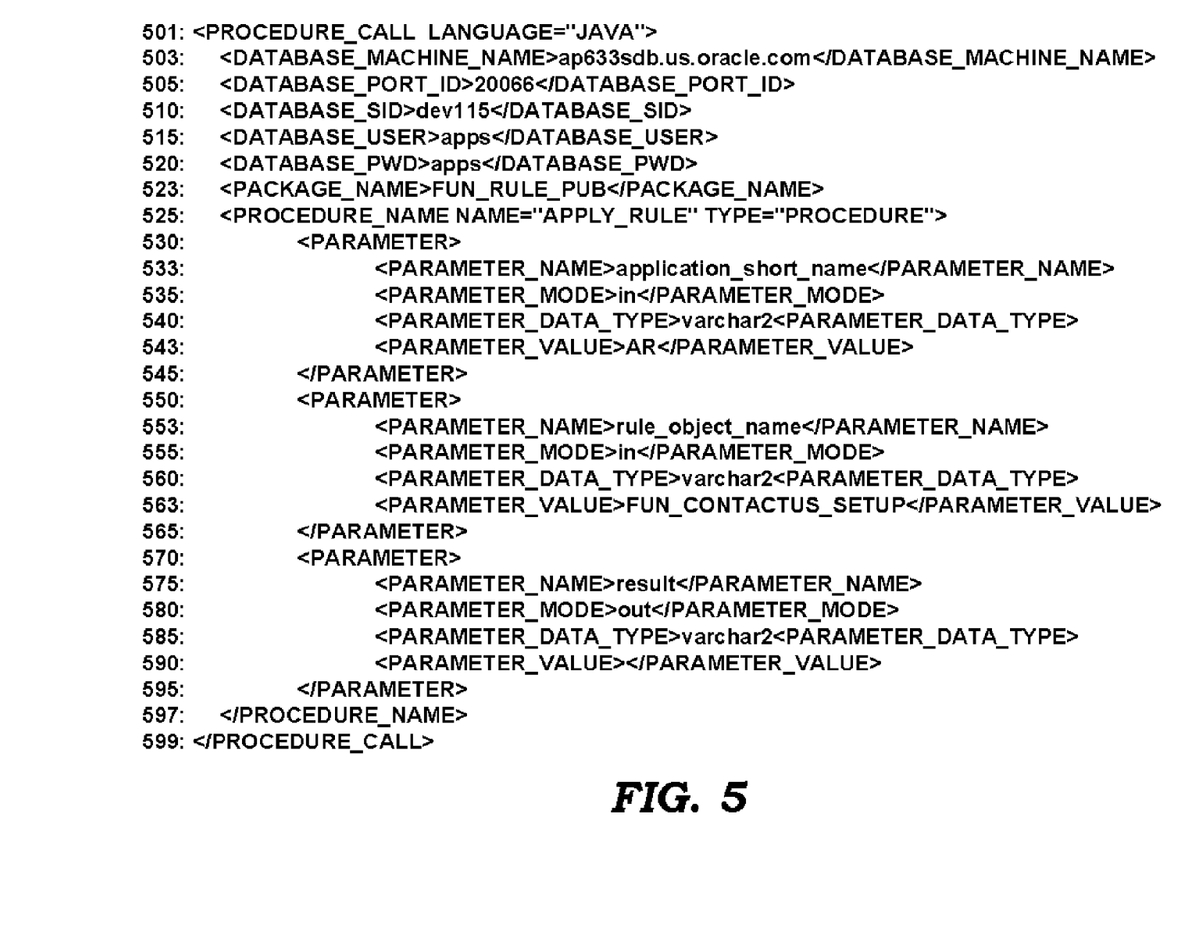
FIG. 5 represents a file on server system containing details in addition to the received parameter attributes, which are determined while generating the instructions for the received request, in an embodiment of the present invention.
Figure 6:
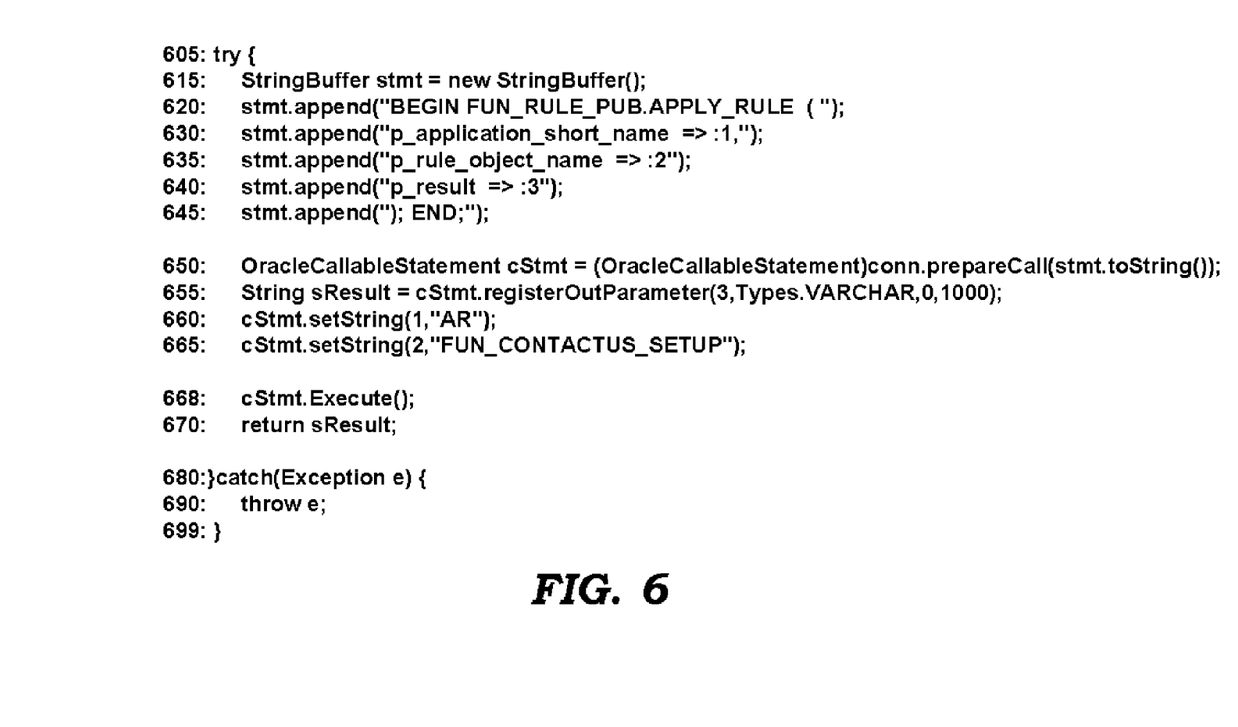
FIG. 6 represents a program code generated by a PPD system, which is then executed in the PPD System to generate/send the instructions for a received request in an embodiment of the present invention.

Broadly, PPD System 150 constructs the instructions consistent with corresponding programming interface, based on the contents of the received request according to various aspects of the present invention. FIGS. 5 and 6 together illustrate how PPD System 150 may determine and send such instructions based on the received request (received as XML content depicted in FIG. 4C) in an embodiment of the present invention. Each figure is explained in detail below.

It may be appreciated that the content of FIG. 5 need not be generated as an XML file for determining the instructions for execution of the procedure of interest on the database server of interest. PPD System 150 on receiving the request may determine the additional information required and may then determine the instructions for executing the procedure. By generating the XML file of FIG. 5, PPD System 150 may reduce the number of times the additional information (since the same procedure may be invoked multiple times) is retrieved from the database, thereby reducing the time required to process a request for the execution of the procedure.

FIG. 5 depicts the content of an XML file containing additional information determined by a server system on receiving a request (shown in FIG. 4C) from a client system in one embodiment.

As may be appreciated from the difference in the contents of files in FIG. 4C and FIG. 5, PPD System 150 receives a request and accordingly (on execution of line 403 or line 409) determines additional information such as parameter mode and parameter data type for some of the received parameters with identifiers as indicated in corresponding lines 445, 465 and 485.

Lines 501, 503, 505, 510, 515, 520, 523 and 525 contain corresponding values of lines 411, 413, 413, 415, 420, 425, 430, and 435 and hence the description is not repeated for the lines.

Additional information for the received parameters may be determined using one of the several known techniques. For example, the information may be determined by accessing the database server of interest in one of the paths 159A-159C. For example, the following instructions may be executed on the identified database server (assuming Oracle database version 10i) to determine the additional information of lines 535 and 540:

Select IN_OUT, DATA_TYPE from ALL_ARGUMENTS
where PACKAGE_NAME='FUN_RULE_PUB'
and OBJECT_NAME='APPLY_RULE'
and ARGUMENT_NAME='p_application_short_name';

Information of lines 555 and 560 may be obtained by executing the following instructions on the identified database server in one embodiment:

Select IN_OUT, DATA_TYPE from ALL_ARGUMENTS
where PACKAGE_NAME='FUN_RULE_PUB'
and OBJECT_NAME='APPLY_RULE'
and ARGUMENT_NAME='p_rule_object_name';

Information contained in lines 580 and 585 may be obtained by executing the following command lines on the identified database server:

Select IN_OUT, DATA_TYPE from ALL_ARGUMENTS
where PACKAGE_NAME='FUN_RULE_PUB'
and OBJECT_NAME='APPLY_RULE'
and ARGUMENT_NAME='p_result';

Once the corresponding information is retrieved from the database server, the information can be represented conveniently again in XML format. Further, the determined additional information may be stored in a local memory and used in processing later received requests.

Thus, lines 535 and 540 depict tags "PARAMETER_MODE" and "PARAMETER_DATA_TYPE" whose content depict the parameter mode and the parameter data type for the parameter with identifier "p_application_short_name" (as show in line 533 or line 445) respectively. Similarly, lines 555 and 560 depict the additional information for the parameter with identifier "p_rule_object_name" (as shown in line 553 or line 465). Lines 580 and 585 depict the additional information for the parameter with identifier "p_result" (as shown in line 575 or line 485).

PPD System 150 further determines instructions consistent with programming interface from the contents received request and the additional information (step 230), as described below in relation to FIG. 6.

FIG. 6 depicts the software code in Java™ language (programming environment in client system 110A as indicated in line 411) formed by PPD System 150, which when executed generates the instructions consistent with the programming interface of database server 190A (assuming Oracle Database version 8i available from Oracle Corporation, the assignee of the subject patent application).

Line 601 initiates a variable "cStmt" of object type "OracleCallableStatement". According to line 615, a new instance "stmt" of an object of type StringeBuffer( ) representing a buffer for holding the instructions, is created. As may be appreciated, PPD System 150 builds instructions based on the content of the file of FIG. 5. Lines 620 contains the portion of the instructions thus formed indicating that procedure "APPLY_RULE" (line 523) in package "FUN_RULE_PUB" (525) on the database server is sought to be executed.

Content of lines 630, 635 and 640 indicates that PPD System 150 builds the portion of the instructions based on the contents of respective set of corresponding lines {533, 535, 540,543}, {553,555, 560,563} and {575,580,585,590}.

Line 650 contains a command, which enables PPD System 150 to enable binding of values of variables contained in the instructions using the content of the file of FIG. 5 to send to the identified database server in corresponding one of the paths of 159A-159C. Accordingly, lines 655, 660, and 665 indicate corresponding portions of the instructions built. For example, line 655 contains command, which defines a variable "sResult" according to the parameter p_result (in line 575). Lines 660 and 665 are instructions which are based on the attributes of parameters "p_application_short_name" (535,540, 543) and "p_rule_object_name" (in lines 555, 560, 563).

PPD System 150 may generate the instructions and store in "cStmt" on executing the command in line 650. Instructions stored in "cStmt" are available for multiple access and execution, in situations where multiple requests are received from client system 110A-110C. Line 668 execute instructions in cStmt by invoking a method "Execute" of the object, on the database server (190A-190C) containing the procedure, and results of execution are contained in variable "sResult". Thus the content represented by the following line is sent as instructions on one of paths 159A-159C depending on the database server specified in the received request.

"BEGIN FUN_RULE_PUB.APPLY_RULE (p_application_short_name=>'AR', p_rule_object_name=>'FUN_CONTACTUS_SETUP', p_result=>OUT); END;"

The above instructions are generated assuming the client application operates in Java environment. However, if the client application operates in a different environment (e.g., Visual Basic), and assuming the database server operates using Oracle Corporation's PLSQL language, the instructions may need to be different and accordingly PPD system 150 generates the corresponding instructions.

Line 670 enables sending the result of execution from database server executing the specified procedure (in step 210) to client system 110A. Lines 680-699 contain command lines, which are executed on PPD System 150 when the instructions determined, could not be executed on database server 190A-190C successfully, according to the programming environment ("Java"). Line 690 enables sending of a corresponding response to client system 110A indicating the failure of execution of the procedure on database server 190A-190C.

It may be appreciated that since PPD System 150 determines instructions corresponding to execution of the procedure according to the programming interface, programming complexity of client applications executing on a client system can be considerable reduced. It may also be appreciated that since the portion of application executing on client system 110A (FIG. 4A) is reduced as the instructions to execute a procedure of interest (as contained in FIG. 6) are generated and executed on PPD System 150 thereby reducing the programming complexity of the client application.

It should be appreciated that each of PPD System 150 and client systems 110A-110C may be implemented in a combination of one or more of hardware, software and firmware. The description is continued with respect to an embodiment in which various features are operative by execution of corresponding software instructions.

7. Digital Processing System

Figure 7:
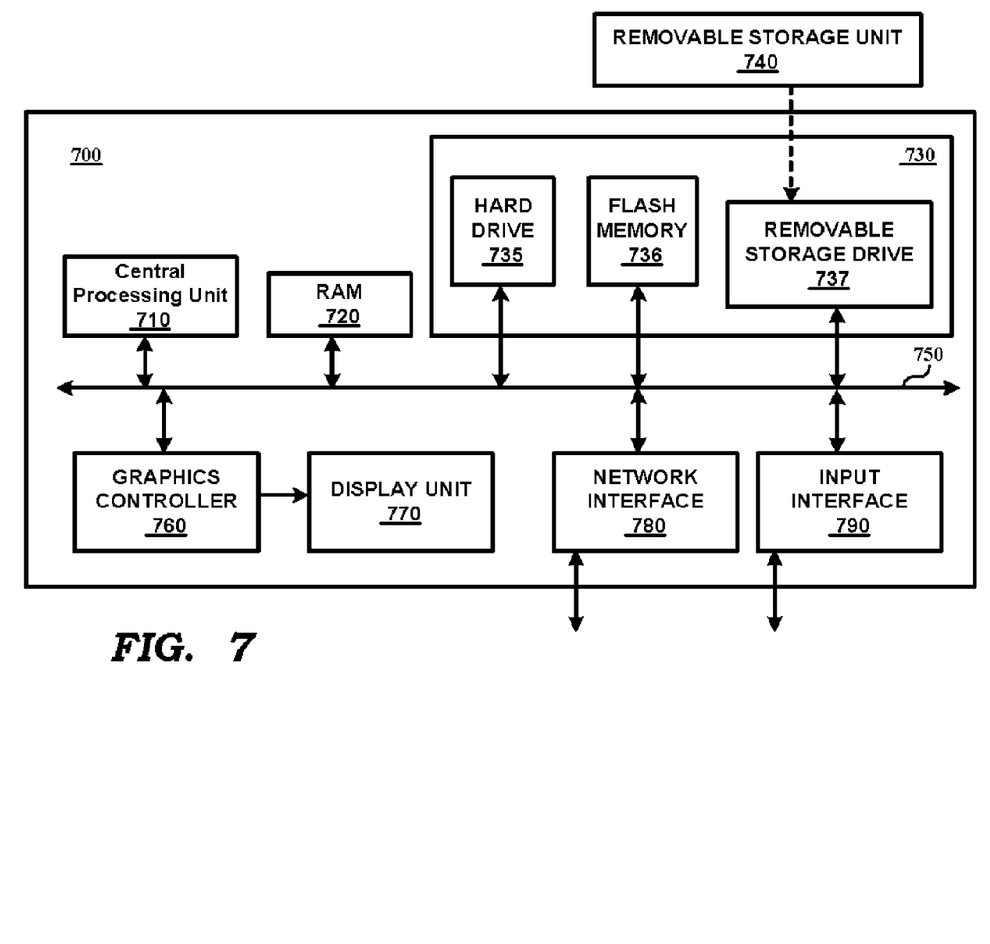
FIG. 7 is a block diagram illustrating an example embodiment in which various aspects of the present invention are operative when software instructions are executed.

FIG. 7 is a block diagram illustrating the details of digital processing system 700 in which various aspects of the present invention are operative by execution of appropriate software instructions. System 700 may correspond to client system 110A-110C, application server 160 and PPD System 150. System 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general purpose processing unit. RAM 720 may receive instructions from secondary memory 730 using communication path 750.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and/or mouse. Network interface 780 provides connectivity to a network (e.g., using Internet Protocol), and may be used to communicate with each other system of FIG. 1.

Secondary memory 730 may contain hard drive 735, flash memory 736 and removable storage drive 737. Secondary memory 730 may store the data and software instructions (e.g., methods instantiated by each of user systems), which enable system 700 to provide several features in accordance with the present invention. Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data.

In this document, the term "computer program product" is used to generally refer to removable storage unit 740 or hard disk installed in hard drive 735. These computer program products are means for providing software to system 700. CPU 710 may retrieve the software instructions, and execute the instructions to provide various features of the present invention described above.

8. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of reducing programming complexity in client applications when interfacing with a plurality of relational database servers operating with a corresponding one of a plurality of programming interfaces, wherein each relational database server facilitates storage and retrieval of data using structured queries according to a structured query language (SQL), wherein each programming interface specifies a format in which instructions are to be provided to cause execution of a corresponding procedure in a corresponding database server, said method being implemented in a server provided between client applications and said plurality of relational database servers, said method comprises:

receiving a first request and a second request from a first client system and a second client system respectively, wherein each of said first request and said second request indicates a procedure contained in a first relational database server for execution, and an identifier of said first relational database server operating with a first programming interface, wherein said first request contains a first text representing a corresponding identifier of a first programming language environment in which applications on said first client system are operative and said second request contains a second text representing a corresponding identifier of a second programming language environment in which applications on said second client system are operative, wherein said first text is different from said second text to specify that said first programming language environment is different from said second programming language environment, wherein said first relational database server and said first programming interface are respectively contained in said plurality of relational database servers and said plurality of programming interfaces;

generating a first software code and a second software code in response to receiving of said first request and said second request respectively, wherein said first software code is generated according to said first programming language environment indicated in said first request, and said second software code is generated according to said second programming language environment indicated in said second request;

executing said first software code and said second software code to cause said server to perform the actions of:

forming a respective plurality of instructions according to said first programming interface in response to receiving of said first request and said second request, wherein said respective plurality of instructions includes a structured query according to said SQL which specifies for execution said procedure on said first relational database server;

sending said respective plurality of instructions, including said structured query according to said SQL, to said first relational database server identified by said identifier to execute said procedure on said first relational database server;

in response to sending said respective plurality of instructions, receiving a respective result from said first relational database server, wherein said result is generated by execution of said procedure contained in said respective plurality of instructions on said first relational database server; and forwarding from said server to said first client system, as a response to said first request, said respective result in the form of a first object created according to said first programming language environment, wherein said forwarding forwards from said server to said second client system, as a response to said second request, said respective result in the form of a second object created according to said second programming language environment, wherein said first software code receives said respective result from said first relational database server, creates said first object according to said first programming language environment based on the received result and forwards the created first object according to said first programming language environment to said first client system, wherein said second software code receives said respective result from said first relational database server, creates said second object according to said second programming language environment based on the received result and forwards the created second object according to said second programming language environment to said second client system, whereby a first client application in said first client system accesses said respective result from said first object, and a second client application in said second client system accesses said respective result from said second object, thereby simplifying programming complexity in said first client application and said second client application.

2. The method of claim 1, wherein said first request received from said first client system does not contain a type of a parameter used in execution of said procedure of interest, wherein said forming comprises:

determining said type of said parameter; and
incorporating said type into said plurality of instructions sent to said first relational database server.

3. The method of claim 2, wherein said determining comprises sending a database query according to said SQL to said first relational database server and receiving a corresponding response, wherein said corresponding response indicates said type, wherein said incorporating incorporates said type indicated in said response.

4. The method of claim 2, wherein said determining comprises retrieving data indicating said type from a secondary storage.

5. The method of claim 1, wherein said first request received from said first client system does not contain a mode of a parameter used in execution of said procedure of interest, wherein said mode indicates whether said parameter is an input to said procedure of interest or an output generated by said procedure of interest, wherein said forming comprises:
   determining said mode of said parameter; and
   incorporating said mode into said plurality of instructions sent to said first relational database server.

6. The method of claim 5, wherein said determining comprises sending a database query according to said SQL to said first relational database server and receiving a corresponding response, wherein said corresponding response indicates said mode,
   wherein said incorporating incorporates said mode indicated in said response.

7. The method of claim 1, wherein said first request and said second request are received in the form of a markup language which specifies said identifier associated with a first tag according to said markup language and said first text and said second text representing corresponding programming languages associated with a second tag according to said markup language.

8. A non-transitory computer readable medium storing one or more sequences of instructions which when executed on a server system reduces programming complexity in client applications when interfacing with a plurality of relational database servers operating with a corresponding one of a plurality of programming interfaces, wherein each relational database server facilitates storage and retrieval of data using structured queries according to a structured query language (SQL), wherein each programming interface specifies a format in which instructions are to be provided to cause execution of a corresponding procedure in a corresponding database server, wherein execution of said one or more sequences of instructions by one or more processors contained in said server system causes said server system to perform the actions of:
   receiving a first request and a second request from a first client system and a second client system, wherein each of said first request and said second request indicates a procedure contained in a first relational database server for execution and an identifier of said first relational database server operating with a first programming interface, wherein said first relational database server and said first programming interface are respectively contained in said plurality of relational database servers and said plurality of programming interfaces,
   wherein said first request contains a first text representing a corresponding identifier of a first programming language environment in which applications on said first client system are operative and said second request contains a second text representing a corresponding identifier of a second programming language environment in which applications on said second client system are operative, wherein said first text is different from said second text to specify that said first programming language environment is different from said second programming language environment;
   forming a respective plurality of instructions according to said first programming interface in response to receiving of said first request and said second request, wherein said respective plurality of instructions includes a structured query according to said SQL which specifies for execution said procedure on said first relational database server;
   sending said respective plurality of instructions, including said structured query according to said SQL, to said first relational database server identified by said identifier to execute said procedure on said first relational database server;
   in response to sending said respective plurality of instructions, receiving a respective result from said first relational database server, wherein said result is generated by execution of said procedure contained in said respective plurality of instructions on said first relational database server; and
   forwarding from said server system to said first client system, as a response to said first text in said first request, said respective result in the form of a first object created according to said first programming language environment,
   wherein said forwarding forwards from said server system to said second client system, as a response to said second text in said second request, said respective result in the form of a second object created according to said second programming language environment,
   whereby a first client application in said first client system accesses said respective result from said first object, and a second client application in said second client system accesses said respective result from said second object, thereby simplifying programming complexity in said first client application and said second client application,
   wherein said forming and sending together comprises:
      generating a first software code and a second software code, which when executed in said server system causes said respective plurality of instructions to be formed and sent to said first relational database server,
      said first software code further to receive said respective result from said first relational database server, create said first object based on the received result and to forward the created first object according to said first programming language environment to said first client system,
      said second software code further to receive said respective result from said first relational database server, create said second object based on the received result and to forward the created second object according to said second programming language environment to said second client system,
      wherein said generating generates, in response to receiving of said first text in said first request, said first software code according to said first programming language environment, and
      wherein said generating generates, in response to said receiving of said second text in said second request, said second software code according to said second programming language environment.

9. The non-transitory computer readable medium of claim 8, further comprising:
   receiving a response corresponding to execution of said plurality of instructions on said first relational database server; and
   sending said response to said first client system,
   wherein said sending of said of plurality of instructions, said receiving of said response and said sending of said response to said first client system are performed by executing said software code in said server system.

10. A server system reducing programming complexity in client applications when interfacing with a plurality of relational database servers operating with a corresponding one of a plurality of programming interfaces, wherein each relational database server facilitates storage and retrieval of data using structured queries according to a structured query language (SQL), wherein each programming interface specifies a format in which instructions are to be provided to cause execution of a corresponding procedure in a corresponding relational database server, said server system comprises:

a memory to store instructions;

a processor to retrieve the instructions stored in said memory, and to execute the retrieved instructions, wherein execution of the retrieved instructions causes said server system to perform the actions of:

receiving a first request and a second request from a first client system and a second client system respectively, wherein each of said first request and said second request indicates a procedure contained in a first relational database server for execution and an identifier of said first relational database server operating with a first programming interface, wherein said first relational database server and said first programming interface are respectively contained in said plurality of relational database servers and said plurality of programming interfaces, wherein said first request contains a first text representing a corresponding identifier of a first programming language environment in which applications on said first client system are operative, said first text being contained in said first request when said first request is sent from said first client system to said server system, wherein said second request contains a second text representing a corresponding identifier of a second programming language environment in which applications on said second client system are operative, said second text being contained in said second request when said second request is sent from said second client system to said server system, wherein said first text is different from said second text to specify that said first programming language environment is different from said second programming language environment;

forming a respective plurality of instructions according to said first programming interface in response to receiving of said first request and said second request, wherein said respective plurality of instructions includes a structured query according to said SQL which specifies for execution said procedure on said first relational database server;

sending said respective plurality of instructions, including said structured query according to said SQL, to said first relational database server identified by said identifier to execute said procedure on said first relational database server;

in response to sending said respective plurality of instructions, receiving a respective result from said first relational database server, wherein said result is generated by execution of said procedure contained in said respective plurality of instructions on said first relational database server; and forwarding from said server system to said first client system, as a response to said first text in said first request, said respective result in the form of a first object created according to said first programming language environment, wherein said forwarding forwards from said server system to said second client system, as a response to said second text in said second request, said respective result in the form of a second object created according to said second programming language environment, whereby a first client application in said first client system accesses said respective result from said first object, and a second client application in said second client system accesses said respective result from said second object, thereby simplifying programming complexity in said first client application and said second client application, wherein said forming and sending together generate a first software code and a second software code, which when executed by said server system causes said respective plurality of instructions to be formed and sent to said first relational database server, said first software code further to receive said respective result from said first relational database server, create said first object based on the received result and to forward the created first object according to said first programming language environment to said first client system, said second software code further to receive said respective result from said first relational database server, create said second object based on the received result and to forward the created second object according to said second programming language environment to said second client system, wherein said first software code is generated according to said first programming language environment, in response to receiving of said first text in said first request, and wherein said second software code is generated according to said second programming language environment, in response to said receiving of said second text in said second request.

11. The server system of claim 10, further performing the actions of:

receiving a response corresponding to execution of said plurality of instructions on said first relational database server; and sending said response to said first client system, wherein said sending of said of plurality of instructions, said receiving of said response and said sending of said response to said first client system are performed by executing said software code in said server system.

12. The method of claim 1, wherein said first programming language environment is one of Java, Visual Basic and .NET and said second programming language environment is one of the remaining two programming language environments, such that said first object is forwarded consistent with said one of the three environments indicated by said first text in said first request, and said second object is forwarded consistent with said one of the remaining two programming language environments indicated by said second text in said second request.

13. A computing system comprising:

a first relational database server to facilitate storage and retrieval of data using structured queries according to a structured query language (SQL), wherein a first programming interface specifies a format in which instructions are to be provided to cause execution of a corresponding procedure in said relational database server; and a server system comprising at least one processor and at least one memory, said at least one processor to retrieve instructions from said at least one memory and execute the retrieved instructions to cause said server system to:

receive a first request and a second request from a first client system and a second client system respectively, wherein each of first request and said second request indicates a procedure contained in a first relational database server for execution and an identifier of said first relational database server operating with a first programming interface, wherein said first request contains a first text representing a corresponding identifier of a first programming language environment in which applications on said first client system are operative, said first text being contained in said first request when said first request is sent from said first client system to said server system, wherein said second request contains a second text representing a corresponding identifier of a second programming language environment in which applications on said second client system are operative, said second text being contained in said second request when said second request is sent from said second client system to said server system, wherein said first text is different from said second text to specify that said first programming language environment is different from said second programming language environment;

form a respective plurality of instructions according to said first programming interface in response to receiving of said first request and said second request, wherein said respective plurality of instructions includes a structured query according to said SQL which specifies for execution said procedure on said first relational database server;

send said respective plurality of instructions, including said structured query according to said SQL, to said first relational database server identified by said identifier to execute said procedure on said first relational database server;

in response to sending said respective plurality of instructions, receive a respective result from said first relational database server, wherein said respective results are generated by execution of said procedure contained in said respective plurality of instructions on said first relational database server; and forward from said server system to said first client system, as a response to said first text in said first request, the corresponding result in the form of a first object created according to said first programming language environment, wherein said forwarding forwards from said server system to said second client system, as a response to said first text in said second request, the corresponding result in the form of a second object created according to said second programming language environment, whereby a first client application in said first client system accesses said respective result from said first object, and a second client application in said second client system accesses said respective result from said second object, thereby simplifying programming complexity in said first client application and said second client application, wherein said form and send together comprises:

generate a first software code and a second software code, which when executed in said server system causes said respective plurality of instructions to be formed and sent to said first relational database server, said first software code further to receive said respective result from said first relational database server, create said first object based on the received result and to forward the created first object according to said first programming language environment to said first client system, said second software code further to receive said respective result from said first relational database server, create said second object based on the received result and to forward the created second object according to said second programming language environment to said second client system, wherein said generate generates, in response to receiving of said first text in said first request, said first software code according to said first programming language environment, and wherein said generate generates, in response to said receiving of said second text in said second request, said second software code according to said second programming language environment.

14. A method of reducing programming complexity in client applications when interfacing with a plurality of relational database servers operating with a corresponding one of a plurality of programming interfaces, wherein each relational database server facilitates storage and retrieval of data using structured queries according to a structured query language (SQL), wherein each programming interface specifies a format in which instructions are to be provided to cause execution of a corresponding procedure in a corresponding relational database server, said method being implemented in a server system provided between client applications and said plurality of relational database servers, said method comprising:

receiving a first request and a second request from a first client system and a second client system respectively, wherein each of said first request and said second request indicates a procedure contained in a first relational database server for execution and an identifier of said first relational database server operating with a first programming interface, wherein said first relational database server and said first programming interface are respectively contained in said plurality of relational database servers and said plurality of programming interfaces, wherein said first request contains a first text representing a corresponding identifier of a first programming language environment in which applications on said first client system are operative, said first text being contained in said first request when said first request is sent from said first client system to said server system, wherein said second request contains a second text representing a corresponding identifier of a second programming language environment in which applications on said second client system are operative, said second text being contained in said second request when said second request is sent from said second client system to said server system, wherein said first text is different from said second text to specify that said first programming language environment is different from said second programming language environment;

forming a respective plurality of instructions according to said first programming interface in response to receiving of said first request and said second request, wherein said respective plurality of instructions includes a structured query according to said SQL which specifies for execution said procedure on said first relational database server;

sending said respective plurality of instructions, including said structured query according to said SQL, to said first relational database server identified by said identifier to execute said procedure on said first relational database server;

in response to sending said respective plurality of instructions, receiving a respective result from said first relational database server, wherein said result is generated by execution of said procedure contained in said respective plurality of instructions on said first relational database server; and forwarding from said server system to said first client system, as a response to said first request, said respective result in the form of a first object created according to said first programming language environment in response to said first text being contained in said first request, wherein said forwarding forwards from said server system to said second client system, as a response to said second request, said respective result in the form of a second object created according to said second programming language environment in response to said second text being contained in said request, whereby a first client application in said first client system accesses said respective result from said first object, and a second client application in said second client system accesses said respective result from said second object, thereby simplifying programming complexity in said first client application and said second client application, wherein said forming and sending together comprises:

generating a first software code and a second software code, which when executed in said server system causes said respective plurality of instructions to be formed and sent to said first relational database server, said first software code further to receive said respective result from said first relational database server, create said first object based on the received result and to forward the created first object according to said first programming language environment to said first client system, said second software code further to receive said respective result from said first relational database server, create said second object based on the received result and to forward the created second object according to said second programming language environment to said second client system, wherein said generating generates said first software code according to said first programming language environment, in response to receiving of said first text in said first request, and wherein said generating generates said second software code according to said second programming language environment, in response to said receiving of said second text in said second request.

\* \* \* \* \*